US008649317B2

(12) United States Patent
Horiuchi et al.

(10) Patent No.: US 8,649,317 B2
(45) Date of Patent: Feb. 11, 2014

(54) WIRELESS COMMUNICATION RELAY STATION APPARATUS, WIRELESS COMMUNICATION APPARATUS, WIRELESS COMMUNICATION RELAY METHOD, AND WIRELESS COMMUNICATION METHOD

(75) Inventors: Ayako Horiuchi, Kanagawa (JP); Yasuaki Yuda, Kanagawa (JP); Seigo Nakao, Kanagawa (JP); Daichi Imamura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 91 days.

(21) Appl. No.: 13/376,653

(22) PCT Filed: Jun. 21, 2010

(86) PCT No.: PCT/JP2010/004133
§ 371 (c)(1),
(2), (4) Date: Dec. 7, 2011

(87) PCT Pub. No.: WO2010/150517
PCT Pub. Date: Dec. 29, 2010

(65) Prior Publication Data
US 2012/0082085 A1 Apr. 5, 2012

(30) Foreign Application Priority Data

Jun. 22, 2009 (JP) ................................. 2009-147849

(51) Int. Cl.
*H04B 7/14* (2006.01)

(52) U.S. Cl.
USPC ........................................................ 370/315

(58) Field of Classification Search
USPC ................. 370/208, 254, 310, 312, 315, 319; 455/11, 69
See application file for complete search history.

(56) References Cited

U.S. PATENT DOCUMENTS

| 2006/0120271 | A1* | 6/2006 | Yu et al. | 370/208 |
| 2006/0270360 | A1* | 11/2006 | Han et al. | 455/69 |
| 2006/0285505 | A1* | 12/2006 | Cho et al. | 370/254 |
| 2007/0081483 | A1* | 4/2007 | Jang et al. | 370/315 |
| 2007/0155315 | A1* | 7/2007 | Lee et al. | 455/11.1 |
| 2010/0149961 | A1* | 6/2010 | Lee et al. | 370/204 |
| 2012/0082085 | A1* | 4/2012 | Horiuchi et al. | 370/315 |
| 2012/0099518 | A1* | 4/2012 | Park et al. | 370/315 |

FOREIGN PATENT DOCUMENTS

| JP | 63-299529 A | 12/1988 |
| JP | 5-259956 A | 10/1993 |
| JP | 2002-252587 A | 9/2002 |

OTHER PUBLICATIONS

Qualcomm Europe: "Operation of Relays in LTE-A", 3GPP TSG-RAN WG1 #54bis, R1-084401, pp. 1-7, Retrieved from Internet: <URL:http://ftp.3gpp.org/ftp/tsg_ran/WG1_RL1/TSGR1_55/docs/R1-084401.zip> dated Oct. 3, 2008.
Alcatel Lucent Shanghai Bell; "Type II Relay Considerations with the Separation of Control and Data", 3GPP TSG RAN WG1 #57, R1-092162, pp. 1-6, Retrieved from the Internet: <URL:http://ftp.3gpp.org/ftp/tsg_ran/WG1_RL1/TSGR1_57/Docs/R1-092162.zip> dated May 8, 2009.
Nokia, Nokia Siemens Networks; "Considerations on TDD Relay", 3GPP TSG RAN WG1 Meeting #56, R1-090734, pp. 1-4, dated Feb. 9-13, 2009.
International Search Report for PCT/JP2010/004133 dated Sep. 21, 2010.

* cited by examiner

*Primary Examiner* — Anh-Vu Ly
*Assistant Examiner* — Gustavo Lopez-Vargas
(74) *Attorney, Agent, or Firm* — Pearne & Gordon LLP

(57) ABSTRACT

A wireless communication relay station apparatus, a wireless communication apparatus, a wireless communication relay method and a wireless communication method are presented that effectively utilize resources and prevent loop interference. A wireless communication relay station relays communication between a first wireless communication apparatus and a second wireless communication apparatus in at least two or more frequency bands and includes a transmitter for using a first subframe to transmit a first uplink signal to the first wireless communication apparatus in a first frequency band, and transmitting a first downlink signal to the second wireless communication apparatus in a second frequency band. A relay station receiver receives a second downlink signal from the first wireless communication apparatus in the first frequency band, and receives a second uplink signal from the second wireless communication apparatus in the second frequency band.

12 Claims, 12 Drawing Sheets

FIG.9

| Subframe # | 0 | 1 | 2 | 3 | 4 | 5 | 6 | 7 | 8 | 9 |
|---|---|---|---|---|---|---|---|---|---|---|
| Configuration# 1 | DL | S | UL | UL | DL | DL | S | UL | UL | DL |
| Carrier 1 | DL | S | UL | backhaul | backhaul FakeMBSFN | DL | S | UL | UL | DL |
| Carrier 2 | DL | S | UL | DL PHICH | UL PUCCH | DL | S | UL | UL | DL |

WIRELESS COMMUNICATION RELAY STATION APPARATUS, WIRELESS COMMUNICATION APPARATUS, WIRELESS COMMUNICATION RELAY METHOD, AND WIRELESS COMMUNICATION METHOD

TECHNICAL FIELD

The present invention relates to a wireless communication relay station apparatus, a wireless communication apparatus, a wireless communication relay method and a wireless communication method, and in particular relates to a wireless communication relay station apparatus, a wireless communication apparatus, a wireless communication relay method and a wireless communication method for transmission/reception of data to/from another wireless communication apparatus via the wireless communication relay station apparatus.

BACKGROUND ART

In recent years, in a cellular mobile communication system, it has been becoming a common practice to transmit not only sound data but also large-volume data such as static image data and moving image data along with implementation of multimedia information service. In order to realize large-volume data transmission, studies have been actively conducted on a technique for realizing a high transmission rate by utilizing a high frequency wireless bandwidth.

However, when a high frequency wireless bandwidth is utilized, a high transmission rate can be expected at a short distance but attenuation is increased in accordance with a transmission distance as the distance is increased. Hence, when a mobile communication system in which a high frequency wireless bandwidth is utilized is actually placed in operation, a coverage area of a wireless communication base station apparatus (hereinafter abbreviated as a "base station") is reduced, and therefore, there arises the necessity for installation of a larger number of base stations. Since the cost of installation of base stations is correspondingly high, there is a strong demand for a technique for realizing communication service that utilizes a high frequency wireless bandwidth while suppressing an increase in the number of base stations.

To satisfy such a demand, studies have been conducted on a relay transmission technique in which a wireless communication relay station apparatus (hereinafter abbreviated as a "relay station") is installed between a base station and a wireless communication terminal apparatus (hereinafter abbreviated as a "mobile station") so as to increase a coverage area of each base station, and communication between the base station and the mobile station is performed via the relay station. FIG. 10 is a schematic diagram illustrating an overall configuration of a conventional wireless relay system. With the use of the relay technique illustrated in FIG. 10, a terminal (mobile station 20), which is unable to directly communicate with a base station 10, is also allowed to communicate with the base station 10 via a relay station 30. Note that a mobile station 21 is a terminal subordinate to the base station 10.

[Description of TDD TD Relay]

Further, as a method for dividing links into an uplink (UL) and a downlink (DL), a TDD system is known. In the TDD system, links are divided into an uplink (hereinafter referred to as "UL") and a downlink (hereinafter referred to as "DL") in a time-division manner. Referring now to FIG. 11, general outlines of a relay system in which a relay station is applied in a TDD system will be described below. FIG. 11 is a conceptual diagram of the relay system in which the TDD system is used for relaying of the relay station 30.

Hereinafter, for the sake of description, the base station 10, the relay station 30, the mobile station 21 and the mobile station 20 will be simply referred to as "eNB", "RN", "UE1" and "UE2", respectively.

For example, when the term "TRANSMISSION UL" is provided in FIG. 11, a signal is transmitted via an uplink (UL) in the direction indicated by the arrow from any one of UE1, LTE-A UE2 and RN, which plays a predominant role in the corresponding operation (left end of FIG. 11), by using any one of subframes #2 to #5 serving as the corresponding subframe (upper row in FIG. 11).

As illustrated in FIG. 11, RN uses part of resources allocated to UL and part of resources allocated to DL to transmit/receive data to/from eNB, and during this period, RN suspends service provided to UE2 connected to RN. FIG. 11 illustrates an example in which the subframes #2 and #3 are UL subframes serving as subframes for the uplink, and subframes #4 and #5 are subframes for the downlink. In this example, the subframes #3 and #4 are used to perform communication between RN and eNB through UL and DL, respectively.

CITATION LIST

Non-Patent Literature

Non-Patent Document 1: 3GPP TSG RAN WG1 Meeting #56, R1-090734, "Considerations on TDD Relay", Athens, Greece, Feb. 9-13, 2009

SUMMARY OF THE INVENTION

Technical Problem

[Carrier Aggregation]

Furthermore, there is a technique called "carrier aggregation" in which a base station simultaneously provides service of two or more frequency bands (carriers). In carrier aggregation, when attention is given to a single frequency band, a system is established just by the single frequency band, and therefore, selection is allowed between the use of only a single carrier and the use of a plurality of carriers in accordance with configurations of UE1 and UE2 and requests therefrom.

In a TDD system that performs carrier aggregation, UL and DL configurations are preferably coordinated with each other in order to prevent loop interference. When the configurations are not coordinated with each other, there occurs a problem that transmission and reception differ between the carriers and a signal of a transmission antenna causes loop interference in a reception antenna.

However, even if the configurations are coordinated with each other, further studies are necessary when RN simultaneously provides service of two or more frequency bands (carriers). Referring to FIG. 12, an example in which loop interference occurs in a TDD system that performs carrier aggregation will be described. FIG. 12 is a diagram for describing an example in which loop interference occurs in a TDD system that performs carrier aggregation.

Note that in the TDD system illustrated in FIG. 12, carrier aggregation is performed using the following two frequency bands: a frequency band 1 (Carrier 1 in FIG. 12) and a frequency band 2 (Carrier 2 in FIG. 12).

Note that for the sake of the following description, a base station 10, a relay station 30, a mobile station 21 and a mobile station 20 will be simply referred to as "eNB", "RN", "UE1" and "UE2", respectively.

Note that for the sake of the following description, operations of eNB, RN, UE1 and UE2 in the frequency band 1 in FIG. 12 are similar to those of eNB, RN, UE1 and UE2 in FIG. 11.

As illustrated in FIG. 12, when subframes are partially used for communication between eNB and RN in the frequency band 1, and service is provided to UE2 by RN in the frequency band 2, transmission and reception of signals of the frequency band 1 and signals of the frequency band 2 are opposite to each other, thereby causing loop interference in RN. That is to say, in the frequency band 1, RN transmits UL data using a subframe #3, and receives DL data using a subframe #4.

On the other hand, as illustrated in FIG. 12, in the frequency band 2, RN receives UL data using the subframe #3, and transmits DL data using the subframe #4. In other words, using the subframe #3, RN transmits data in the frequency band 1 and receives data in the frequency band 2, thus causing loop interference. Similarly, using the subframe #4, RN receives data in the frequency band 1 and transmits data in the frequency band 2, thus causing loop interference.

An object of the present invention is to provide a wireless communication relay station apparatus, a wireless communication apparatus, a wireless communication relay method and a wireless communication method which are capable of effectively utilizing resources and preventing loop interference.

Solution to Problem

The present invention provides a wireless communication relay station apparatus for relaying communication between a first wireless communication apparatus and a second wireless communication apparatus in at least two or more frequency bands, the wireless communication relay station apparatus including: a transmitter which is configured, in a first subframe, to transmit a first uplink signal to the first wireless communication apparatus in a first frequency band, and to transmit a first downlink signal to the second wireless communication apparatus in a second frequency band; and a receiver which is configured, in a second subframe, to receive a second downlink signal from the first wireless communication apparatus in the first frequency band, and to receive a second uplink signal from the second wireless communication apparatus in the second frequency band.

In the wireless communication relay station apparatus, the first subframe is a subframe configured for an uplink through which a communication between the wireless communication relay station apparatus and the second wireless communication apparatus is performed, and the second subframe is a subframe configured for a downlink through which a communication between the wireless communication relay station apparatus and the second wireless communication apparatus is performed.

The wireless communication relay station apparatus further includes a timing setter which is configured to set a transmission timing for the first uplink signal in the first subframe in accordance with a transmission delay amount between the wireless communication relay station apparatus and the first wireless communication apparatus, and the transmitter is configured, at the set transmission timing, to transmit the first uplink signal to the first wireless communication apparatus in the first frequency band, and to transmit the first downlink signal to the second wireless communication apparatus in the second frequency band.

In the wireless communication relay station apparatus, the timing setter is configured to set the transmission timing so as to increase a symbol number in accordance with increase in the transmission delay amount between the wireless communication relay station apparatus and the first wireless communication apparatus, the symbol number indicating a number at which the transmission to the first wireless communication apparatus in the first subframe is started.

The wireless communication relay station apparatus further includes a control information generator which is configured generate transmission timing control information indicative of the set transmission timing of the first uplink signal in the first subframe, by the timing setter, and the transmitter is configured to transmit the generated transmission timing control information to the second wireless communication apparatus.

The wireless communication relay station apparatus further includes a timing setter which is configured to set a reception timing for the second downlink signal in the second subframe in accordance with a transmission delay amount between the wireless communication relay station apparatus and the first wireless communication apparatus, and the receiver is configured, at the set reception timing, to receive the second downlink signal from the first wireless communication apparatus in the first frequency band, and to receive the second uplink signal from the second wireless communication apparatus in the second frequency band.

The wireless communication relay station apparatus further includes a control information generator which is configured to generate reception timing control information indicative of the set reception timing of the second downlink signal in the second subframe, by the timing setter, and the transmitter is configured to transmit the generated reception timing control information to the second wireless communication apparatus.

In the wireless communication relay station apparatus, the receiver is configured to receive a response signal from the second wireless communication apparatus in the second subframe, the response signal indicating a signal responsive to downlink signals transmitted in the first frequency band and the second frequency band using a third subframe preceding the second subframe by four or more symbols.

In the wireless communication relay station apparatus, the transmitter is configured to transmit a response signal to the second wireless communication apparatus in the first subframe, the response signal indicating a signal responsive to uplink signals received in the first frequency band and the second frequency band using a fourth subframe preceding the first subframe by four or more symbols.

The present invention also provides a wireless communication apparatus for communicating with another wireless communication apparatus via a wireless communication relay station apparatus in at least two or more frequency bands, the wireless communication apparatus including: a receiver which is configured, in a first subframe configured for an uplink through which a communication between the wireless communication relay station apparatus and the wireless communication apparatus is performed, to receive a first downlink signal relayed from the wireless communication relay station apparatus in a predetermined frequency band, and in a second subframe configured for a downlink through which a communication between the wireless communication relay station apparatus and the wireless communication apparatus is performed, to receive an allocation signal for transmission of a second uplink signal to the wireless communication relay station apparatus; and a transmitter which is configured to transmit the second uplink signal to the wireless communication relay station apparatus in the second subframe in accordance with the allocation signal.

In the wireless communication relay station apparatus, the receiver is configured to receive the first downlink signal from the wireless communication relay station apparatus in the first subframe in accordance with transmission timing control information indicative of a transmission timing of the first downlink signal from the wireless communication relay station apparatus, the transmission timing being set in accordance with a transmission delay amount between the wireless communication relay station apparatus and the another wireless communication apparatus and being coordinated with a transmission timing of a first uplink signal from the wireless communication relay station apparatus to the another wireless communication apparatus in the first subframe.

In the wireless communication relay station apparatus, the receiver is configured to receives reception timing control information indicative of reception timing of the second uplink signal for the wireless communication relay station apparatus, the reception timing being set in accordance with a transmission delay amount between the wireless communication relay station apparatus and the another wireless communication apparatus and being coordinated with a reception timing of a second downlink signal from the another wireless communication apparatus to the wireless communication relay station apparatus in the second subframe, and the transmitter is configured to transmit the uplink signal to the wireless communication relay station apparatus in the second subframe in accordance with the reception timing control information.

In the wireless communication relay station apparatus, the transmitter is configured to transmit a response signal to the wireless communication relay station apparatus in the second subframe, the response signal indicating a signal responsive to downlink signals received in the predetermined frequency band and another frequency band different from the predetermined frequency band using a third subframe preceding the second subframe by four or more symbols.

In the wireless communication relay station apparatus, the receiver is configured to receive a response signal from the wireless communication relay station apparatus in the first subframe, the response signal indicating a signal responsive to uplink signals transmitted in the predetermined frequency band and another frequency band different from the predetermined frequency band using a fourth subframe preceding the first subframe by four or more symbols.

The present invention also provides a wireless communication relay method in a wireless communication relay station apparatus for relaying communication between a first wireless communication apparatus and a second wireless communication apparatus in at least two or more frequency bands, the wireless communication relay method including: in a first subframe, transmitting a first uplink signal to the first wireless communication apparatus in a first frequency band, and transmitting a first downlink signal to the second wireless communication apparatus in a second frequency band; and in a second subframe, receiving a second downlink signal from the first wireless communication apparatus in the first frequency band, and receiving a second uplink signal from the second wireless communication apparatus in the second frequency band.

The present invention also provides a wireless communication method in a wireless communication apparatus for communicating with another wireless communication apparatus via a wireless communication relay station apparatus in at least two or more frequency bands, the wireless communication method including: in a first subframe configured for an uplink through which a communication between the wireless communication relay station apparatus and the wireless communication apparatus is performed, receiving a first downlink signal relayed from the wireless communication relay station apparatus in a predetermined frequency band, and in a second subframe configured for a downlink through which a communication between the wireless communication relay station apparatus and the wireless communication apparatus is performed, receiving an allocation signal for transmission of a second uplink signal to the wireless communication relay station apparatus; and transmitting the second uplink signal to the wireless communication relay station apparatus in the second subframe in accordance with the allocation signal.

Advantageous Effects of the Invention

A wireless communication relay station apparatus, a wireless communication apparatus, a wireless communication relay method and a wireless communication method according to the present invention are capable of effectively utilizing resources and preventing loop interference.

BRIEF DESCRIPTION OF THE DRAWINGS

FIG. 9 is a diagram for describing operations of RN and LTE-A UE2 performed using respective subframes of a configuration #1 in Embodiment 1.

MODE FOR CARRYING OUT THE INVENTION

Hereinafter, embodiments of the present invention will be described with reference to the drawings.

Embodiment 1

Figure 1:
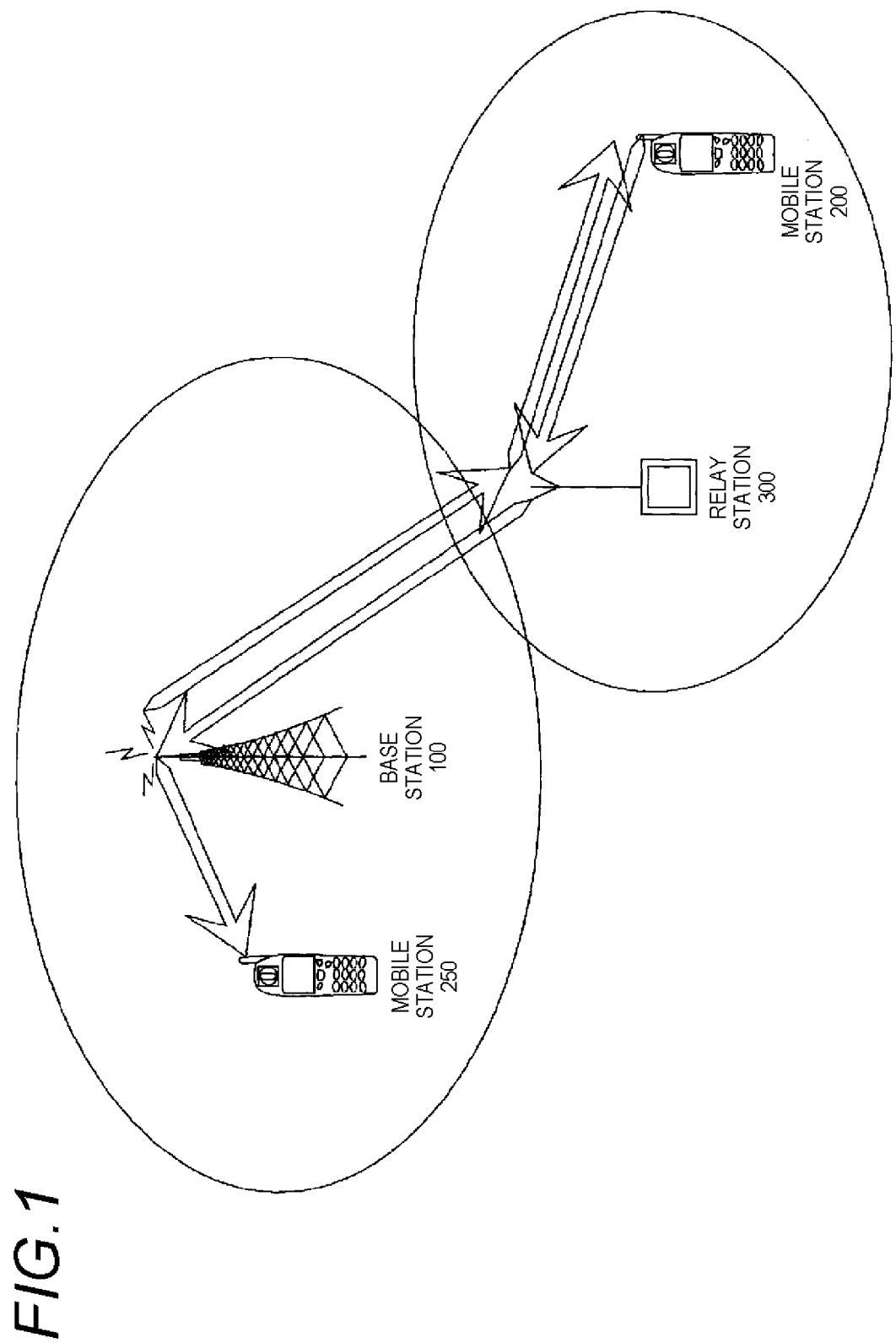
FIG. 1 is a schematic diagram illustrating a configuration of a wireless relay system according to Embodiment 1.

Referring to FIGS. 1 to 9, a wireless relay system according to Embodiment 1 will be described. FIG. 1 is a schematic diagram illustrating a configuration of the wireless relay system according to Embodiment 1. The wireless relay system illustrated in FIG. 1 includes: a base station 100; a mobile station 200; a mobile station 250; and a relay station 300. As illustrated in FIG. 1, in the wireless relay system according to Embodiment 1, the relay station 300 is installed between the base station 100 and the mobile station 200 in order to increase a coverage area of the base station 100, and communication between the base station 100 and the mobile station 200 is performed via the relay station 300. Note that the mobile station 250 is a terminal subordinate to the base station 100.

In the wireless relay system according to Embodiment 1, a time division duplex (TDD) system is adopted as a communication method, and time division relay (TD relay) is adopted as a relay method.

In the wireless relay system according to Embodiment 1, carrier aggregation in which the base station 100 simultaneously provides service of two or more frequency bands (carriers) is performed. In carrier aggregation, when attention is given to a single frequency band, a system is established by the single frequency band, and therefore, selection is allowed between the use of only a single carrier and the use of a plurality of carriers in accordance with configurations of the mobile stations and requests therefrom.

In the wireless relay system according to Embodiment 1, data is relayed through two hops from the base station 100 to the mobile station 200 via the relay station 300.

The mobile station 200 serves as a terminal (UE) adaptable to an LTE-A (Long Term Evolution Advanced) communication system.

Hereinafter, in Embodiment 1, the base station 100, the mobile station 200, the mobile station 250 and the relay station 300 will be simply referred to as "eNB", "LTE-A UE2", "UE1" and "RN", respectively.

In the wireless relay system according to Embodiment 1, for subframes used between eNB and RN in one frequency band, switching is performed between an uplink (UL) and a downlink (DL) in the other frequency band when they are used. Thus, since transmission and reception in a plurality of frequency bands can be coordinated with each other in RN, RN is capable of transmitting/receiving data to/from UE2 in a state where no interruption-induced interference occurs. Hereinafter, the uplink and the downlink will be simply referred to as "UL" and "DL", respectively.

Figure 2:
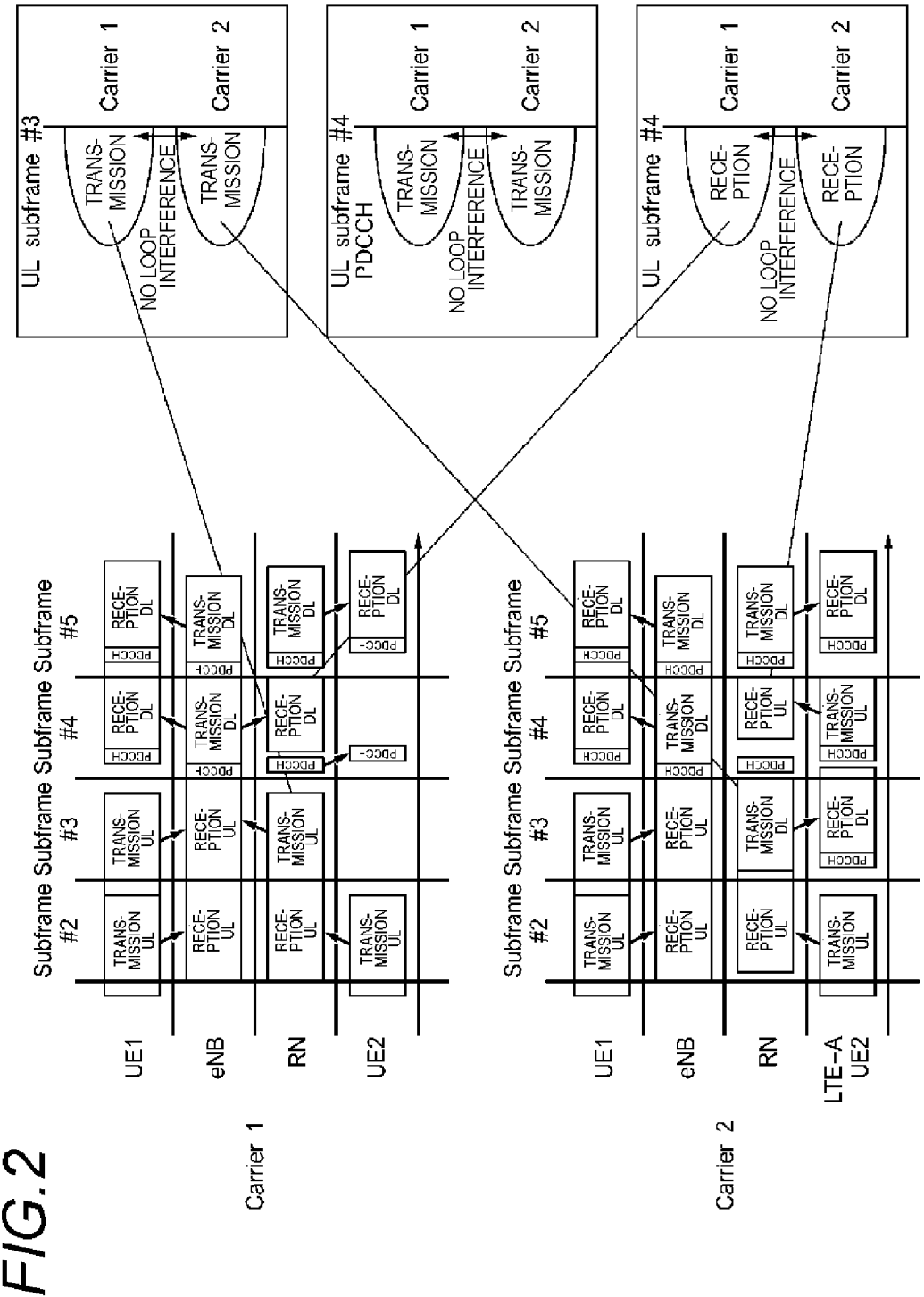
FIG. 2 is a diagram for describing an operation example of the wireless relay system according to Embodiment 1.

Next, referring to FIG. 2, an operation example of the wireless relay system according to Embodiment 1 will be described. FIG. 2 is a diagram for describing the operation example of the wireless relay system according to Embodiment 1. Referring to FIG. 2, in each of two frequency bands 1 and 2 (described as Carriers 1 and 2 in FIG. 2), each of eNB, UE1, LTE-A UE2 and RN transmits/receives data via the uplink or downlink using a plurality of subframes #2 to #5. FIG. 2 illustrates the example in which the subframes #2 and #3 are UL subframes serving as uplink (UL) subframes, and the subframes #4 and #5 are DL subframes serving as downlink (DL) subframes. In this example, the subframes #3 and #4 in the frequency band 1 are used for communication between RN and eNB for UL and DL, respectively.

For example, for Carrier 1 in FIG. 2, when the term "TRANSMISSION UL" is provided, a signal is transmitted via the uplink (UL) in the direction indicated by the arrow from any one of UE1, LTE-A UE2 and RN, which plays a predominant role in the operation, by using any one of the subframes #2 to #5 in the frequency band 1 (Carrier 1).

As illustrated in FIG. 2, RN transmits/receives data to/from eNB by using part of resources allocated to UL and part of resources allocated to DL, and during this period, RN suspends service provided to UE2 connected to RN.

In the frequency band 1 (Carrier 1 in FIG. 2), using the subframe #3 that is UL in terms of configuration, RN transmits a UL signal to eNB. Further, using the subframe #4 that is DL in terms of configuration, RN receives a DL signal from eNB.

In the frequency band 2 (Carrier 2 in FIG. 2), using the subframe #3 that is UL in terms of configuration, RN transmits a DL signal to LTE-A UE2. Further, using the subframe #4 that is DL in terms of configuration, RN receives a UL signal from LTE-A UE2.

As described above, in both of the frequency bands 1 and 2, RN transmits a UL signal or a DL signal using the subframe #3, and therefore, effective utilization of resources is enabled, thereby preventing occurrence of loop interference. Furthermore, in both of the frequency bands 1 and 2, RN receives a UL signal or a DL signal using the subframe #4, and therefore, effective utilization of resources is enabled, thereby preventing occurrence of loop interference. Moreover, although RN transmits PDCCH serving as a control signal in a head part of the subframe #4, RN transmits the control signal to UE2 even when the subframe #4 in the frequency band 2 is used for UL, thus enabling effective utilization of resources and making it possible to prevent occurrence of loop interference in both of the frequency bands 1 and 2.

Actually, in the operation example of the wireless relay system according to Embodiment 1 illustrated in FIG. 2, the timing at which RN communicates with eNB differs from the timing at which RN communicates with UE2. Hence, RN is incapable of allowing the sharing of a reception circuit and a transmission circuit in the frequency bands 1 and 2 in this situation.

<Transmission/Reception Timing of RN>

Figure 3:
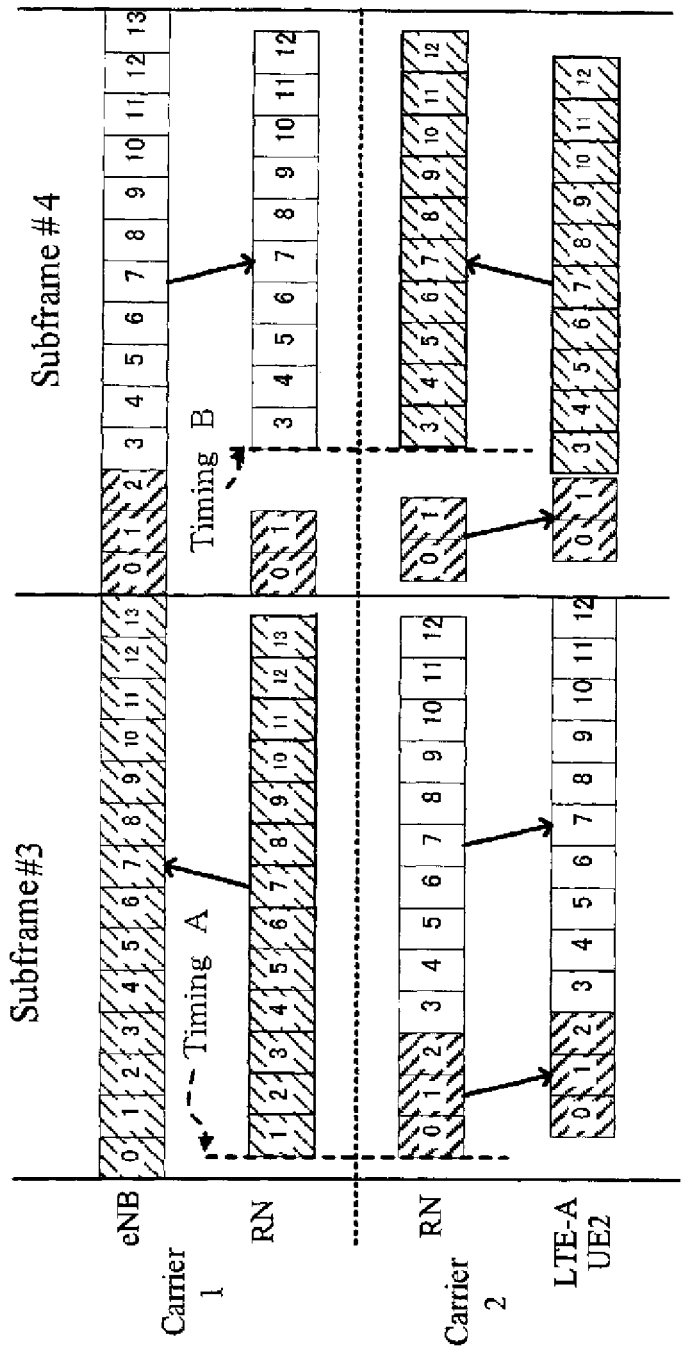
FIG. 3 is a diagram illustrating timings at which data is transmitted/received using subframes #3 and #4 in the wireless relay system according to Embodiment 1.

Therefore, in order that RN may allow the sharing of a reception circuit and a transmission circuit in both of the frequency bands 1 and 2, transmission timings of RN may conceivably be coordinated with each other and reception timings of RN may conceivably be coordinated with each other. Referring to FIG. 3, transmission timings and reception timings of RN in the wireless relay system according to Embodiment 1 will be described. FIG. 3 is a diagram illustrating the timings at which data is transmitted/received using the subframes #3 and #4 in the wireless relay system according to Embodiment 1. Note that SC-FDMA is used for the reception side of eNB, and OFDM is used for the transmission side of eNB.

When RN communicates with eNB, the arrival of a signal transmitted from eNB at RN is delayed through DL, and therefore, the reception of the signal, transmitted from eNB, by RN is delayed in accordance with the transmission delay. On the other hand, through UL, RN hastens the transmission of a UL signal to eNB so as to be coordinated with the reception timing of eNB. However, the signal will be transmitted through UL after the end of communication performed via a subframe previous to UL through which a transmission is made from RN to eNB.

As illustrated in FIG. 3, using the subframe #3 in the frequency band 1 (Carrier 1) configured for UL in terms of configuration, RN transmits a UL signal at the transmission timing coincident with the reception timing of eNB, but in order to transmit an SC symbol #0, RN has to make a transmission at an early time also using the time of another subframe. However, since RN has to receive data using the previous subframe, RN cannot transmit data from the SC symbol #0.

To cope with this, RN starts to transmit data from an SC symbol #1. The SC symbol, from which RN can start the transmission, changes depending on a transmission delay amount between RN and eNB. The SC number from which RN can start the transmission is increased in accordance with increase in the transmission delay amount between RN and eNB.

When RN transmits a signal to UE2 using the same subframe #3 in the frequency band 2 (Carrier 2), RN transmits the signal so that the transmission timing of the frequency band 2 is coordinated with the transmission timing (Timing A in FIG. 3) of the frequency band 1 (Carrier 1). Accordingly, LTE-A UE2 receives DL signals from RN in the frequency band 2 at different synchronizing timings between the subframe #3 and the other subframes.

Therefore, using the subframe #3 configured for UL in terms of configuration, RN notifies LTE-A UE2 of a change in the transmission timing of the subframe through which a DL signal is transmitted. Then, LTE-A UE2, which has received the notification, changes the reception synchronizing timing to receive a DL signal from RN.

Further, in each frequency band, the timing (Timing A in FIG. 3), at which RN starts transmission using the subframe #3 configured for UL in terms of configuration, is delayed relative to the timing of transmission started using a normal subframe. Hence, although RN can transmit 14 OFDM symbols by using a normal subframe, RN can transmit only 13 OFDM symbols to LTE-A UE2 by using the subframe #3 illustrated in FIG. 3.

On the other hand, in the frequency band 1, RN receives a DL signal, transmitted from eNB, by using the subframe #4 configured for DL in terms of configuration. In this case, due to a transmission delay between RN and eNB, the arrival of the DL signal at RN from eNB is delayed relative to the timing of the subframe in accordance with the transmission delay.

Furthermore, when the subframe #4 is set as an MBSFN subframe for RN, RN transmits first 2 OFDM symbols to LTE-A UE2, and therefore, RN is incapable of receiving a DL signal transmitted from eNB in a duration of the 2 symbols.

Herein, "MBSFN subframe" means a subframe prepared for implementation of service such as MBMS (Multimedia Broadcast and Multicast Service) in the future. Specifications of an MBSFN subframe are provided so that cell-specific control information is transmitted by first 2 symbols and an MBMS signal is transmitted by a region of the third and subsequent symbols.

Moreover, when a control signal of eNB has 3 OFDM symbols, data is receivable from an OFDM symbol #3. Therefore, as illustrated in FIG. 3, in the frequency band 1, RN starts to receive data from the OFDM symbol #3 by using the subframe #4. In this case, in the frequency band 2, LTE-A UE2 receives the 2 symbols of the control signal from RN, and then starts to transmit a UL signal from an SC symbol #3 in consideration of a transmission delay amount between LTE-A UE2 and RN. RN provides an instruction to LTE-A UE2 for the timing of the transmission from UE2 to RN so that the timing of reception of a DL signal from eNB at the reception side of RN in the frequency band 1 and the timing of reception of a UL signal from LTE-A UE2 in the frequency band 2 are coordinated with each other at "Timing B" in FIG. 3, for example.

As described above, in the wireless relay system according to Embodiment 1, LTE-A UE2 is capable of receiving a signal from RN at the symbol timing different from that in a normal subframe. Moreover, the transmission timings of RN can be coordinated with each other and the reception timings of RN can be coordinated with each other. Accordingly, the reception circuit and transmission circuit of RN are allowed to be shared between the frequency band 1 and frequency band 2.

Further, when LTE-A UE2 transmits a UL signal by using the subframe configured for DL in terms of configuration (which will hereinafter be referred to as a "DL subframe"), LTE-A UE2 receives a UL signal transmission instruction from RN by using the DL subframe in advance of four or more subframes. Upon recognition that the subframe designated by the UL signal transmission instruction is a DL subframe through which a UL signal cannot be normally transmitted, LTE-A UE2 starts the transmission after reception of PDCCH, serving as a control signal, by using the designated subframe. The timing at which the UL signal transmission is started by LTE-A UE2 is influenced by the length of PDCCH from eNB; thus, when the length of PDCCH is 3 OFDM symbols, the transmission is started from the SC symbol #3 (fourth symbol) as illustrated in FIG. 3. When the length of PDCCH is 2 OFDM symbols, the transmission may be started from the SC symbol #2. However, when a transmission delay between RN and LTE-A UE2 is short and the time required for switching between transmission and reception is long, LTE-A UE2 cannot transmit the UL signal.

Figure 4:
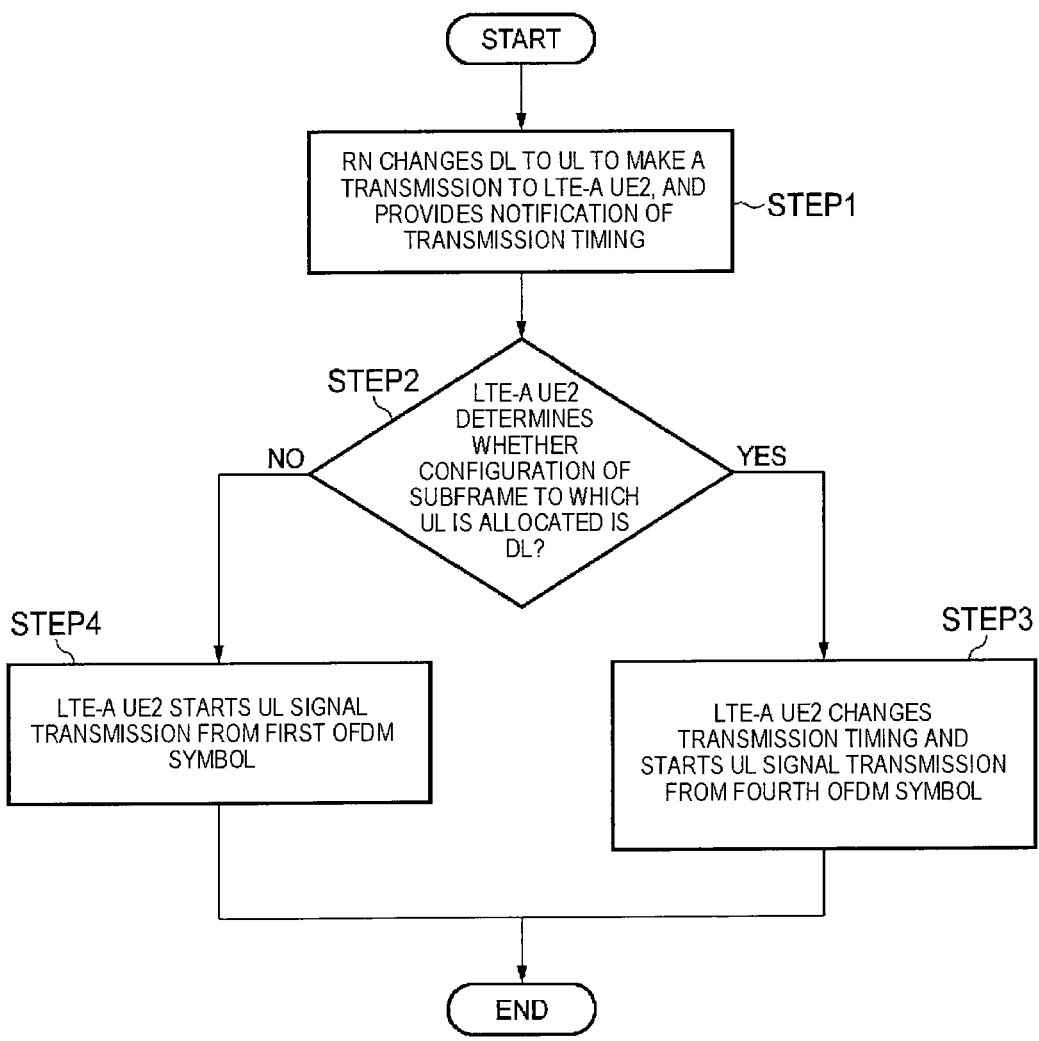
FIG. 4 is a flow chart illustrating an example in which UL is allocated to LTE-A UE2 from RN and LTE-A UE2 changes transmission timing.

Next, referring to FIG. 4, a procedure of transmission timing change by LTE-A UE2 will be described. FIG. 4 provides a flow chart illustrating an example in which UL is allocated to LTE-A UE2 from RN and LTE-A UE2 changes transmission timing.

In STEP 1, RN notifies LTE-A UE2 of a subframe used for backhaul in advance. In other words, RN changes DL to UL to make a transmission to LTE-A UE2. Then, RN provides notification of transmission timing. The notification method may include notification provided using an MBSFN subframe or notification of backhaul position provided by signaling.

In STEP 2, when the subframe to which UL is allocated is a subframe that is used for DL at normal times (i.e., in terms of configuration), LTE-A UE2 moves the procedure to STEP 3, but when the subframe to which UL is allocated is a subframe that is used for UL at normal times (i.e., in terms of configuration), LTE-A UE2 moves the procedure to STEP 4.

In STEP 3, LTE-A UE2 changes the transmission timing to the transmission timing for which the notification has been provided in advance, and starts to transmit a signal from the fourth OFDM symbol. However, when the fact that a PDCCH duration is shorter than three OFDM symbols is known in advance, a signal may be transmitted from the second OFDM symbol or the third OFDM symbol.

In STEP 4, LTE-A UE2 starts to transmit a signal from the first OFDM symbol at the normal transmission timing.

Figure 5:
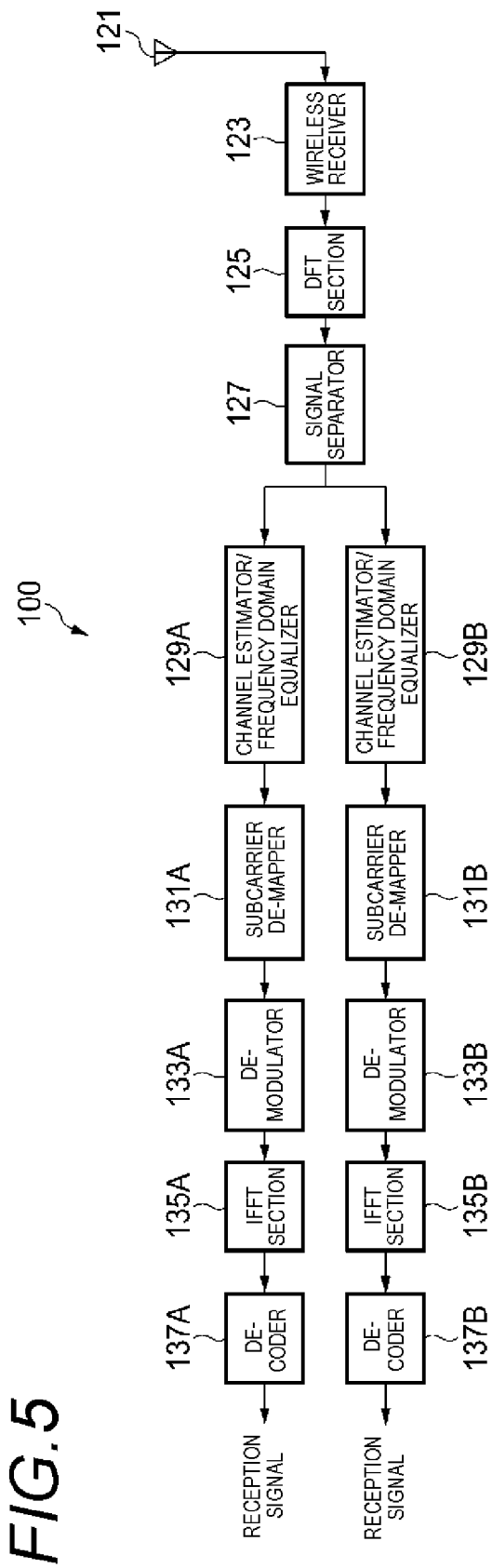
FIG. 5 is a block diagram illustrating a configuration of a reception side of eNB according to Embodiment 1.
Figure 6:
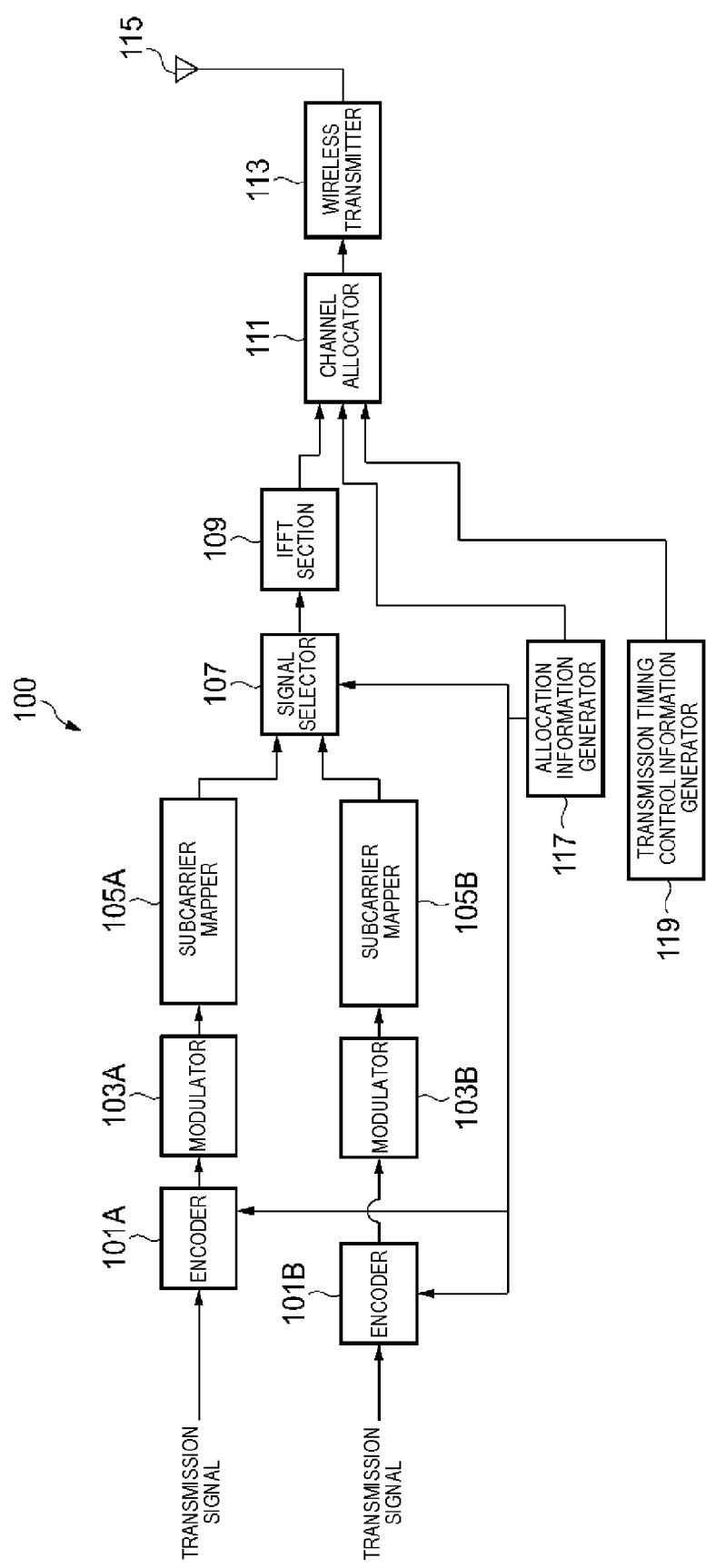
FIG. 6 is a block diagram illustrating a configuration of a transmission side of eNB according to Embodiment 1.

Next, referring to FIGS. 5 and 6, a configuration of the base station (eNB) 100 according to Embodiment 1 will be described. FIG. 5 is a block diagram illustrating a configuration of a reception side of the base station 100 according to Embodiment 1, and FIG. 6 is a block diagram illustrating a configuration of a transmission side of eNB according to Embodiment 1. Note that SC-FDMA is used for the reception side of eNB, and OFDM is used for the transmission side of eNB.

[eNB: Reception Side]

eNB illustrated in FIG. 5 includes: a reception antenna 121; a wireless receiver 123; a DFT section 125; a signal separator 127; channel estimators/frequency domain equalizers 129A and 129B; subcarrier de-mappers 131A and 131B; demodulators 133A and 133B; IFFT sections 135A and 135B; and decoders 137A and 137B.

The wireless receiver 123 receives a signal from RN via the reception antenna 121, performs wireless processing such as downconverting on the signal, and outputs the resulting signal to the DFT (Discrete Fourier Transform) section 125.

The DFT section 125 performs discrete Fourier transform processing on the signal, inputted from the wireless receiver 123, so as to convert a time signal into a frequency component, and outputs the resulting signal to the signal separator 127.

The signal separator 127 separates the frequency component of the time signal, inputted from the DFT section 125, into a signal of the frequency band 1 (which will hereinafter be referred to as a "signal 1") and a signal of the frequency band 2 (which will hereinafter be referred to as a "signal 2"). Then, the signal separator 127 outputs the signal 1 to the channel estimator/frequency domain equalizer 129A, and outputs the signal 2 to the channel estimator/frequency domain equalizer 129B.

The channel estimators/frequency domain equalizers 129A and 129B carry out channel estimation and frequency domain equalization on the signals 1 and 2, respectively, by using a reference signal, and output the resulting signals to the subcarrier de-mappers 131A and 131B.

The subcarrier de-mappers 131A and 131B return signals mapped on subcarriers to original signal sequences, and output the resulting signals to the demodulators 133A and 133B.

The demodulators 133A and 133B demodulate the signals 1 and 2, respectively, in the respective frequency bands, and output the resulting signals to the IFFT sections 135A and 135B.

The IFFT sections 135A and 135B perform inverse fast Fourier transform processing on the demodulated signals 1 and 2, respectively, so as to convert frequency axis signals into time axis signals, and output the resulting signals to the decoders 137A and 137B.

The decoders 137A and 137B decode the signals 1 and 2 processed by the IFFT sections 135A and 135B, respectively, and output the resulting signals as reception signals.

[eNB: Transmission Side]

Next, referring to FIG. 6, the configuration of the transmission side of the base station (eNB) 100 according to Embodiment 1 will be described. The base station 100 (transmission side) illustrated in FIG. 6 includes: encoders 101A and 101B; modulators 103A and 103B; subcarrier mappers 105A and 105B; a signal selector 107; an IFFT section 109; a channel allocator 111; a wireless transmitter 113; a transmission antenna 115; an allocation information generator 117; and a transmission timing control information generator 119.

Based on the traffic from eNB to RN, the traffic from eNB to UE, and the traffic from RN to UE, the allocation information generator 117 allocates resources to be used from eNB to RN and resources to be used from RN to LTE-A UE2 for the frequency bands 1 and 2, thereby generating allocation information. Then, the allocation information generator 117 outputs the generated allocation information to the encoders 101A and 101B, the signal selector 107 and the channel allocator 111.

In the following description of eNB according to the present embodiment, when the mobile station is simply described as UE, UE includes both of the mobile stations (UE), i.e. UE1 subordinate to eNB, and LTE-A UE2.

The transmission timing control information generator 119 generates transmission timing control information by which an instruction for the UL signal transmission timing is provided for UE1 and RN subordinate to eNB, and outputs the transmission timing control information to the channel allocator 111.

Based on the allocation information generated by the allocation information generator 117, the encoders 101A and 101B adjust, in accordance with an OFDM symbol range, the number of symbols to be encoded, encode transmission signals to be transmitted to RN and UE, and output the resulting signals to the modulators 103A and 103B.

The modulators 103A and 103B modulate the encoded transmission signals to be transmitted to RN and UE, and output the resulting signals to the subcarrier mappers 105A and 105B.

The subcarrier mappers 105A and 105B map the modulated transmission signals on subcarriers, and output the resulting signals to the signal selector 107.

The signal selector 107 selects a signal intended for RN and a signal intended for UE from the signals processed by the subcarrier mappers 105A and 105B, and outputs the selected signals to the IFFT section 109.

The IFFT section 109 performs inverse fast Fourier transform processing on the signals, selected by the signal selector 107, so as to convert frequency axis signals into time axis signals, and outputs the resulting signals to the channel allocator 111.

The channel allocator 111 allocates the allocation information, generated by the allocation information generator 117, and the transmission signals to a channel, and outputs the resulting signals to the wireless transmitter 113.

The wireless transmitter 113 performs wireless processing such as upconverting on the modulated signals, and outputs the resulting signals to RN and UE via the transmission antenna 115.

Figure 7:
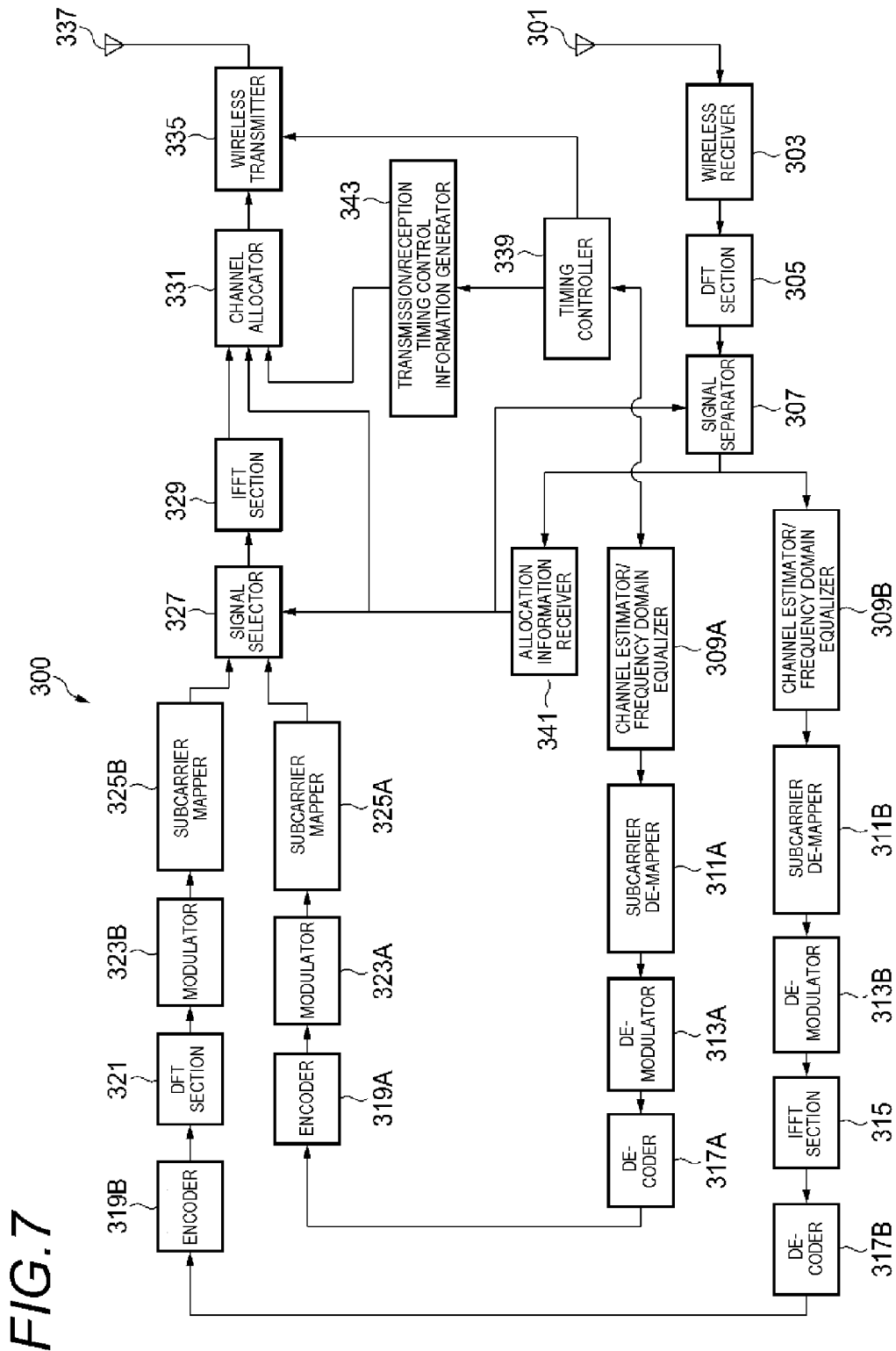
FIG. 7 is a block diagram illustrating a configuration of RN according to Embodiment 1.

Next, referring to FIG. 7, a configuration of the relay station (RN) 300 according to Embodiment 1 will be described. FIG. 7 is a block diagram illustrating the configuration of the relay station (RN) 300 according to Embodiment 1. RN illustrated in FIG. 7 includes: a reception antenna 301; a wireless receiver 303; a DFT section 305; a signal separator 307; channel estimators/frequency domain equalizers 309A and 309B; subcarrier de-mappers 311A and 311B; demodulators 313A and 313B; an IFFT section 315; decoders 317A and 317B; encoders 319A and 319B; a DFT section 321; modulators 323A and 323B; subcarrier mappers 325A and 325B; a signal selector 327; an IFFT section 329; a channel allocator 331; a wireless transmitter 335; a transmission antenna 337; a timing controller 339; an allocation information receiver 341; and a transmission/reception timing control information generator 343.

Note that description of parts common to those described with reference to the block diagrams of eNB illustrated in FIGS. 5 and 6 will be omitted below.

The wireless receiver 303 receives signals from LTE-A UE2 and eNB via the reception antenna 301, performs wireless processing such as downconverting on the signals, and outputs the resulting signals to the DFT (Discrete Fourier Transform) section 305.

The DFT section 305 performs discrete Fourier transform processing on each of the signals, inputted from the wireless receiver 303, so as to convert a time signal into a frequency component, and outputs the resulting signal to the signal separator 307.

The signal separator 307 separates each signal processed by the DFT section 305 into: a signal including allocation information; a signal including transmission timing control information; a relay signal provided from eNB; and a relay signal provided from LTE-A UE2. The signal separator 307 outputs the signal including the allocation information to the allocation information receiver 341, and outputs the signal including the transmission timing control information to the timing controller 339. Furthermore, the signal separator 307 outputs the relay signal provided from eNB and the relay signal provided from LTE-A UE2 to the channel estimators/frequency domain equalizers 309A and 309B, respectively.

In this embodiment, the allocation information separated by the signal separator 307 includes, for each frequency band, subframe allocation information for a subframe to be used for communication between RN and eNB and a subframe to be used for communication between RN and LTE-A UE2

The relay signal, which is a DL OFDM signal provided from eNB and separated by the signal separator 307, is processed by the channel estimator/frequency domain equalizer 309A, the subcarrier de-mapper 311A, the demodulator 313A, the decoder 317A, the encoder 319A, the modulator 323A, and the subcarrier mapper 325A in this order, and is then outputted to the signal selector 327.

The relay signal, which is a UL SC signal provided from LTE-A UE2 and separated by the signal separator 307, is appropriately processed by the channel estimator/frequency domain equalizer 309B, the subcarrier de-mapper 311B, the demodulator 313B, the IFFT section 315, the decoder 317B, the encoder 319B, the DFT section 321, the modulator 323B, and the subcarrier mapper 325B in this order, and is then outputted to the signal selector 327.

In accordance with the allocation information outputted from the allocation information receiver 341 described later, the signal selector 327 selects the UL SC signal to be relayed to eNB or the DL OFDM signal to be relayed to LTE-A UE2, and outputs the selected signal to the IFFT section 329.

Using the transmission timing control information inputted from the signal separator 307, the timing controller 339 generates a transmission timing control signal for controlling transmission timing, and outputs the transmission timing control signal to the transmission/reception timing control information generator 343 and the wireless transmitter 335.

For LTE-A UE2 subordinate to RN, the transmission/reception timing control information generator 343 generates a transmission/reception timing signal which is intended for LTE-A UE2 and by which an instruction for the transmission timing of the UL SC signal and the reception timing of the DL OFDM signal is provided. Further, the transmission/reception timing control information generator 343 outputs the transmission/reception timing signal, intended for LTE-A UE2, to the channel allocator 331. There are provided two types of transmission timing, i.e., timing for transmission via a normal subframe and timing for transmission of the UL SC signal via a DL subframe. There is provided a single type of reception timing, i.e., timing for reception of the DL OFDM signal via a UL subframe.

The allocation information receiver 341 outputs, to the signal selector 327 and the channel allocator 331, the subframe allocation information included in the allocation information outputted from the signal separator 307.

The IFFT section 329 performs inverse fast Fourier transform processing on the signal, selected by the signal selector 327, so as to convert a frequency axis signal into a time axis signal, and outputs the resulting signal to the channel allocator 331.

Based on the subframe allocation information for each subframe, inputted from the allocation information receiver 341, the channel allocator 331 outputs, to the wireless transmitter 335, the relay signal inputted from the IFFT section 329 and to be relayed to eNB or the relay signal inputted from the IFFT section 329 and to be relayed to LTE-A UE2. Furthermore, the channel allocator 331 outputs, to the wireless transmitter 335, the transmission/reception timing signal outputted from the transmission/reception timing control information generator 343 and intended for LTE-A UE2.

The wireless transmitter 335 performs wireless processing such as upconverting on the transmission/reception timing signal intended for LTE-A UE2 or each relay signal which has been outputted from the channel allocator 331, and transmits the resulting signal to eNB or LTE-A UE2 via the transmission antenna 337.

Figure 8:
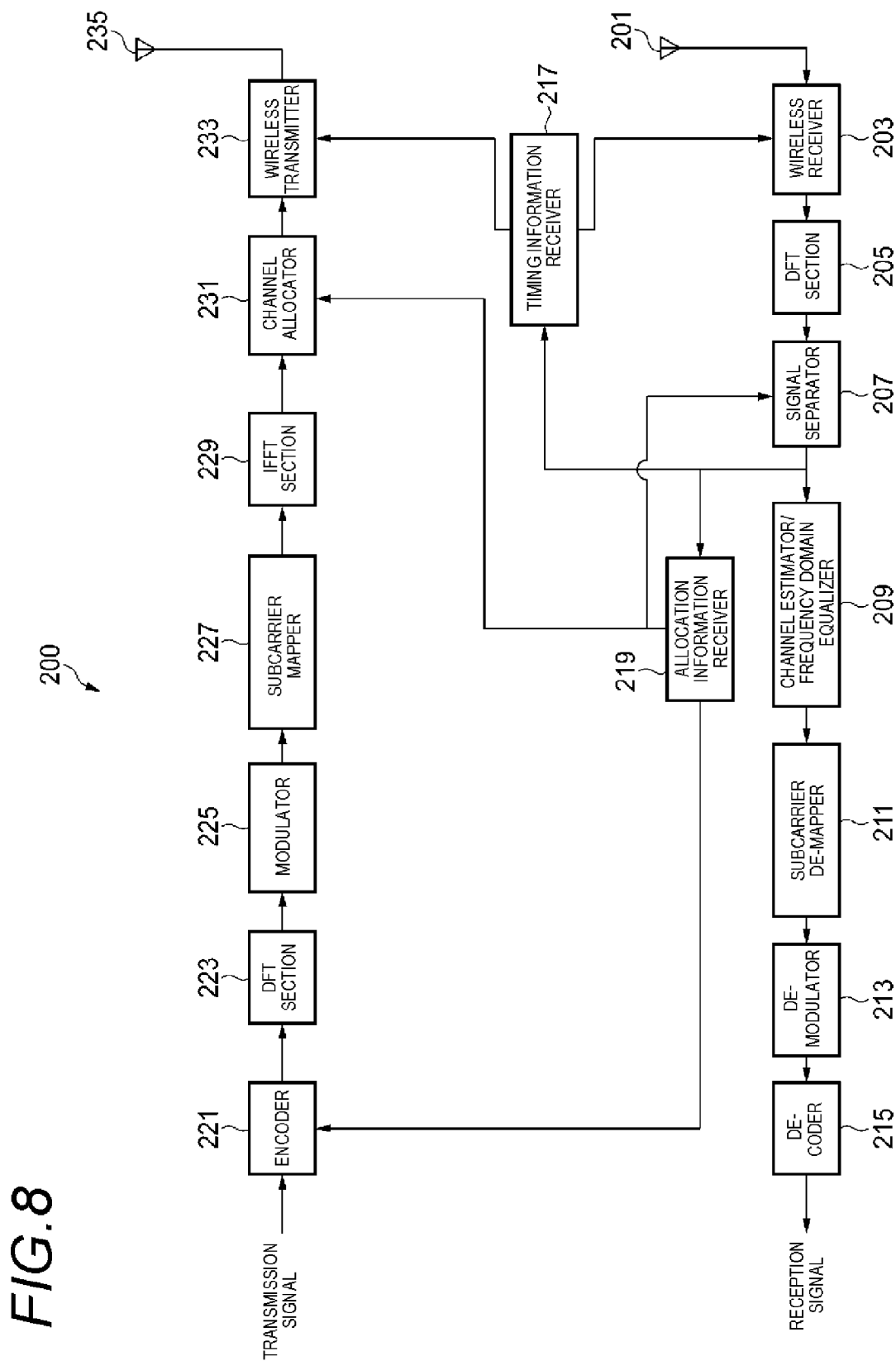
FIG. 8 is a block diagram illustrating a configuration of LTE-A UE2 according to Embodiment 1.
Figure 10:
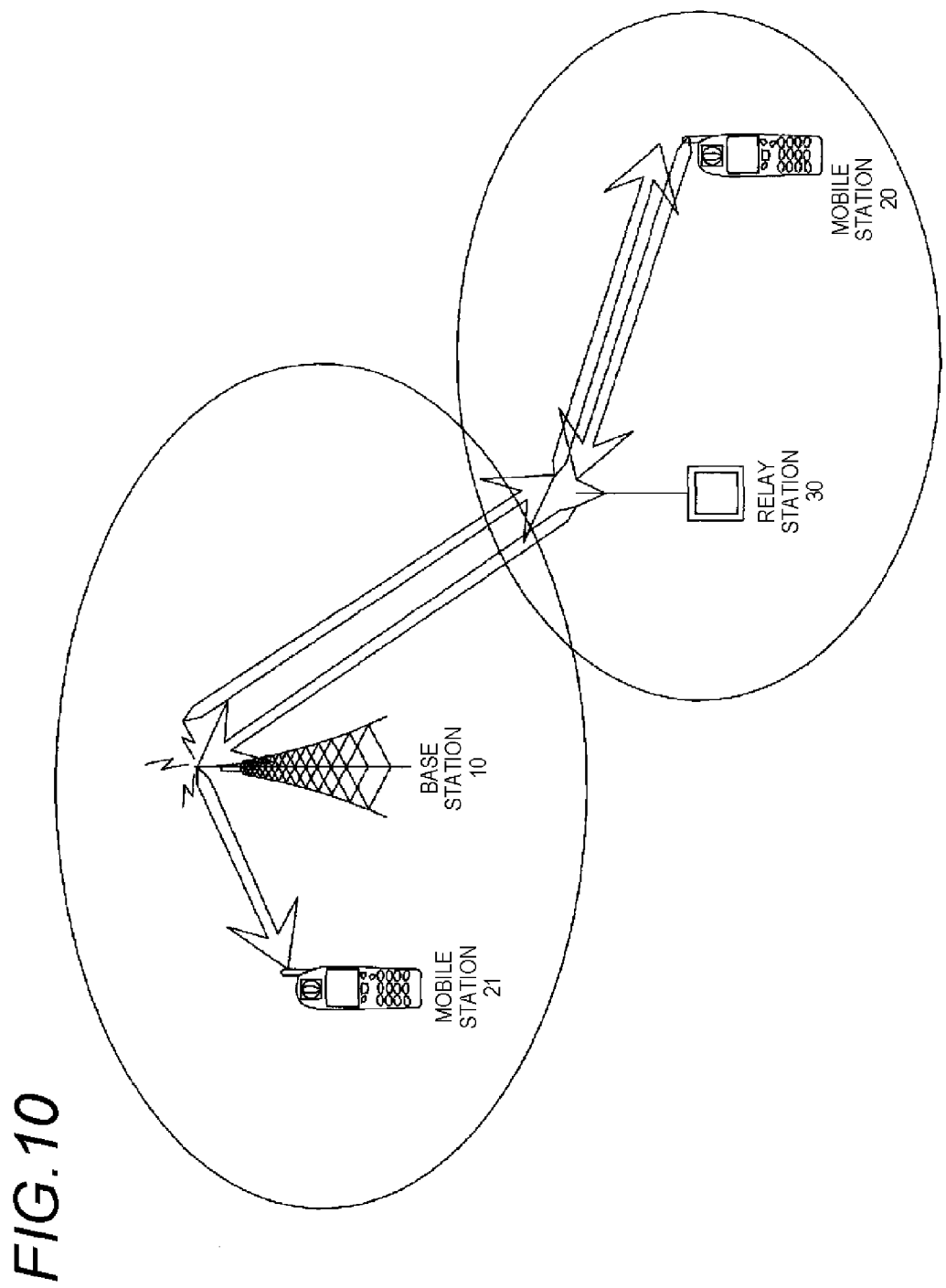
FIG. 10 is a schematic diagram illustrating an overall configuration of a conventional wireless relay system.
Figure 11:
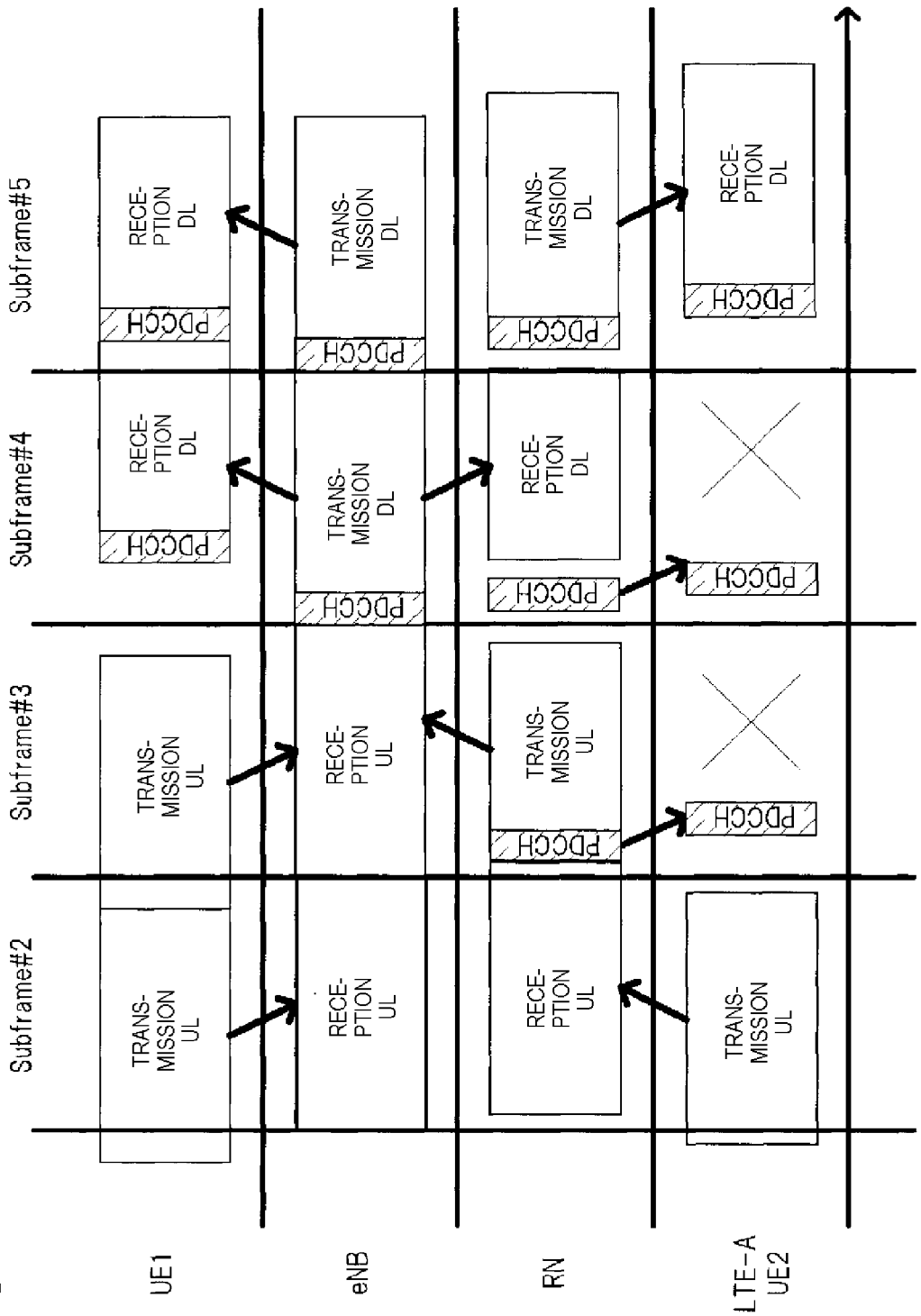
FIG. 11 is a conceptual diagram illustrating a case where a TDD system is applied to relaying of a relay system 30.
Figure 12:
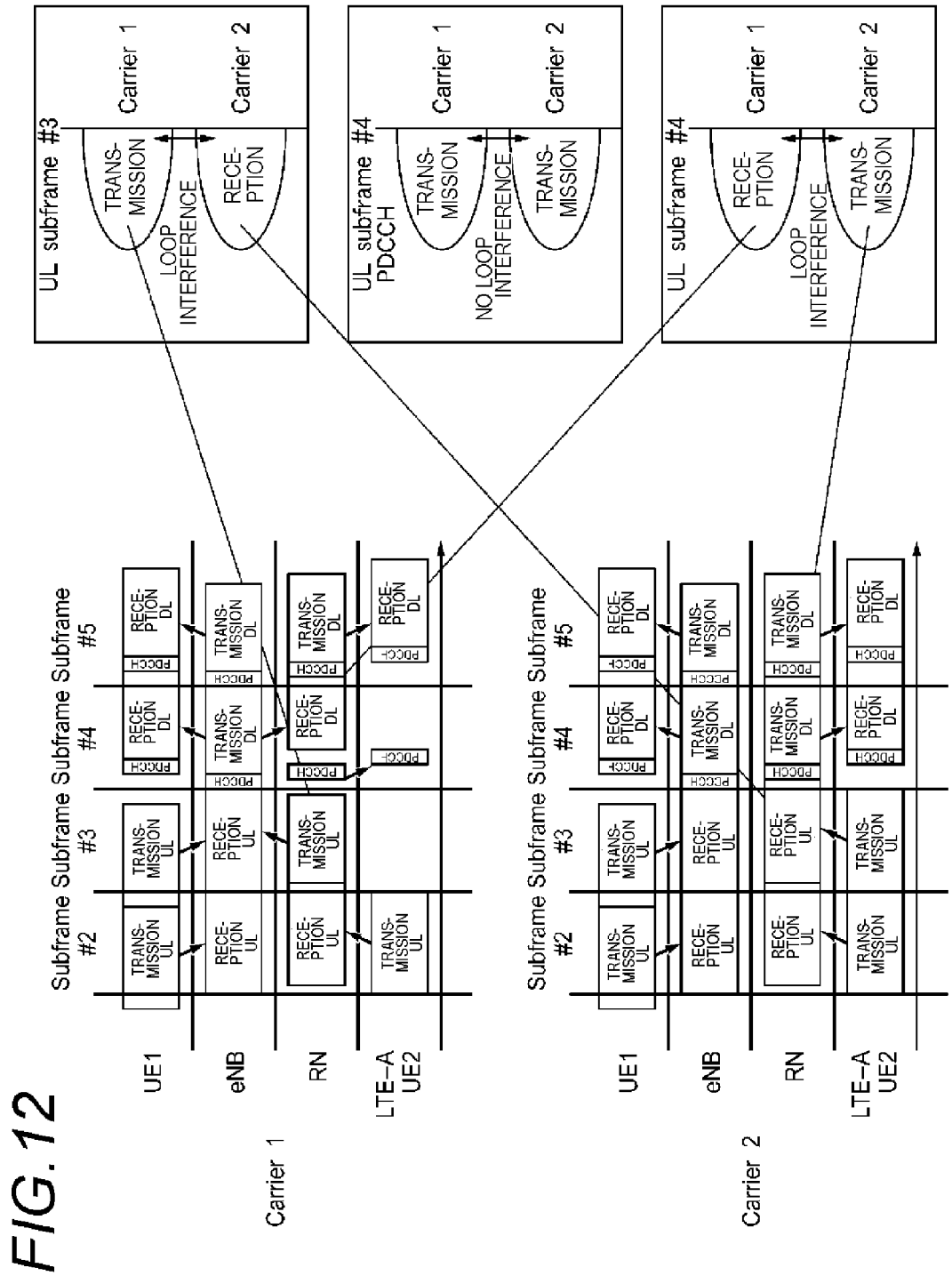
FIG. 12 is a diagram for describing an example in which loop interference occurs in a TDD system that performs carrier aggregation.

Next, referring to FIG. 8, a configuration of the mobile station (LTE-A UE2) 200 according to Embodiment 1 will be described. FIG. 8 is a block diagram illustrating the configuration of the mobile station 200 according to Embodiment 1. The mobile station 200 illustrated in FIG. 8 includes: a reception antenna 201; a wireless receiver 203; a DFT section 205; a signal separator 207; a channel estimator/frequency domain equalizer 209; a subcarrier de-mapper 211; a demodulator 213; a decoder 215; a timing information receiver 217; an allocation information receiver 219; an encoder 221; a DFT section 223; a modulator 225; a subcarrier mapper 227; an IFFT section 229; a channel allocator 231; a wireless transmitter 233; and a transmission antenna 235. Description of parts common to those described with reference to the block diagrams of eNB illustrated in FIGS. 5 and 6 will be omitted.

The wireless receiver 203 receives, via the reception antenna 201, a signal provided from eNB or a signal provided from RN in accordance with a reception timing signal outputted from the timing information receiver 217 and intended for LTE-A UE2. Then, the wireless receiver 203 performs wireless processing such as downconverting on each signal, and outputs the resulting signal to the DFT (Discrete Fourier Transform) section 205.

The DFT section 205 performs discrete Fourier transform processing on the signal, inputted from the wireless receiver 203, so as to convert a time signal into a frequency component, and outputs the resulting signal to the signal separator 207.

The signal separator 207 separates the frequency component of the time signal, inputted from the DFT section 205, into a signal of the frequency band 1 (which will hereinafter be referred to as a "signal 1") and a signal of the frequency band 2 (which will hereinafter be referred to as a "signal 2").

The channel estimator/frequency domain equalizer 209 carries out channel estimation and frequency domain equalization on the signals 1 and 2 by using a reference signal, and outputs the resulting signals to the subcarrier de-mapper 211.

The subcarrier de-mapper 211 restores signals mapped on subcarriers to original signal sequences, and outputs the resulting signals to the demodulator 213.

The demodulator 213 demodulates the signals 1 and 2 separated into the signal provided from RN and the signal provided from eNB for the respective frequency bands, and outputs the resulting signals to the decoder 215.

The decoder 215 decodes each of the demodulated signals, and outputs the reception signals received from RN and eNB.

The timing information receiver 217 extracts transmission/reception timing information from a transmission/reception timing signal received from RN and intended for LTE-A UE2, and outputs the timing information to the wireless transmitter 233 or the wireless receiver 203. The timing information receiver 217 controls transmission timing and reception timing.

The allocation information receiver 219 receives allocation information relayed by RN, and outputs the information to the encoder 221 and the channel allocator 231.

Based on the allocation information received by the allocation information receiver 219, the encoder 221 adjusts, in accordance with an OFDM symbol range, the number of symbols to be encoded, encodes transmission signals to be transmitted to RN and eNB, and outputs the resulting signals to the DFT section 223. In this embodiment, a signal for a subframe by which switching between UL and DL is performed is encoded by the encoder 221 in accordance with the number of bits appropriate to the number of usable OFDM symbols.

The DFT section 223 performs discrete Fourier transform processing on each signal, outputted from the encoder 221, so as to convert a time signal into a frequency component, and outputs the resulting signal to the modulator 225.

The modulator 225 modulates the encoded transmission signals to be transmitted to RN and eNB, and outputs the resulting signals to the subcarrier mapper 227.

The subcarrier mapper 227 maps each of the modulated transmission signals on a subcarrier, and outputs the resulting signal to the IFFT section 229.

The IFFT section 229 performs inverse fast Fourier transform processing on each of the transmission signals, mapped on a subcarrier, so as to convert a frequency axis signal into a time axis signal, and outputs the resulting signal to the channel allocator 231.

The channel allocator 231 allocates, to a channel, the allocation information received by the allocation information receiver 219 and each transmission signal, and outputs the resulting signal to the wireless transmitter 233.

The wireless transmitter 233 performs wireless processing such as upconverting on the modulated signals. Then, based on the transmission timing signal outputted from the timing information receiver 217 and intended for LTE-A UE2, the wireless transmitter 233 transmits the signals to RN and eNB via the transmission antenna 235.

<ACK/NACK Transmission Method>

Next, referring to FIG. 9, an ACK/NACK transmission method for a subframe in which switching between DL and UL is performed in the wireless relay system according to Embodiment 1 will be described.

As mentioned above, when the wireless relay system according to Embodiment 1 includes a subframe used for communication between RN and eNB and a subframe used between RN and LTE-A UE2, LTE-A UE2, which is subordinate to RN and has been simultaneously receiving service of two frequency bands at normal times, is given service of a single frequency band for only a subframe in which switching occurs.

Therefore, using the subframe to which service of the single frequency band is given, eNB, RN and LTE-A UE2 transmit/receive ACK/NACK, resource allocation information and the like for two frequency bands. Referring to FIG. 9, the following description will be made using a configuration #1 as an example. FIG. 9 is a diagram for describing operations of RN and LTE-A UE2 performed using respective subframes of the configuration #1 in Embodiment 1. In FIG. 9, the row of Subframe # indicates subframe numbers. In FIG. 9, the row of Configuration #1 indicates which of the downlink (DL) and uplink (UL) is configured for each subframe of Configuration #1 in terms of configuration. Further, in FIG. 9, the rows of Carrier 1 and Carrier 2 each indicate for which link each subframe is actually used. Note that a symbol "S" in FIG. 9 represents a special subframe. The special subframe serves as a subframe inserted into a subframe in which DL is switched to UL. The special subframe includes a guard period, thus allowing a transmission delay to be absorbed in the guard period.

As illustrated in FIG. 9, in the frequency band 1 (Carrier 1 in FIG. 9), the subframes #3 and #4 are backhaul links used for communication between RN and eNB. On the other hand, in the frequency band 2 (Carrier 2 in FIG. 9), RN transmits a DL subframe to LTE-A UE2 by using the subframe #3 serving as a UL subframe in terms of configuration. Further, in the frequency band 2, RN receives a UL subframe from LTE-A UE2 by using the subframe #4 serving as a DL subframe in terms of configuration. In this case, from the standpoint of LTE-A UE2 subordinate to RN, the subframes #3 and #4 each provide service of only the single frequency band.

Therefore, using a control signal for the subframe #3 of the frequency band 2, RN transmits ACK/NACK and allocation signals for the frequency bands 1 and 2 to LTE-A UE2 subordinate to RN. As defined in LTE, ACK/NACK is transmitted after four or more subframes from data transmission. Hence, ACK/NACK responsive to UL signals (regions surrounded by the broken lines in FIG. 9) transmitted using the subframes #7 and #8 preceding the subframe #3 by four or more subframes is transmitted to LTE-A UE2 by RN. Accordingly, ACK/NACK for the subframes #7 and #8 has been scheduled to be transmitted using the subframe #4 but can be transmitted one subframe earlier. By transmitting ACK/NACK one subframe earlier, transmission can be performed from the subframe #7 when retransmission has to be performed via UL. Note that when ACK/NACK is transmitted using the subframe #4, transmission is performed from the subframe #8.

Further, using the subframe #4 in the frequency band 2, ACK/NACK for DL signals (regions surrounded by the chain double-dashed lines in FIG. 9) transmitted using the subframes #9 and #0 in the frequency bands 1 and 2 is transmitted to RN by LTE-A UE2. Thus, ACK/NACK, which has to be transmitted using the subframe #7, can be transmitted using the subframe #4, thereby making it possible to reduce a retransmission delay.

Furthermore, ACK/NACK to UL and DL for the frequency band 1 is also transmitted. Thus, LTE-A UE2 is capable of transmitting/receiving ACK/NACK to/from RN also by using the subframe by which communication between RN and eNB is performed, thereby obtaining an advantage that a retransmission delay is reduced for both of the two frequency bands.

Moreover, in addition to ACK/NACK, a control signal such as a CQI report, a measurement report or the like for the two frequency bands may be transmitted via UL. Via DL, resource allocation information for the two frequency bands may be transmitted.

When RN transmits ACK/NACK for a plurality of frequency bands via DL like the subframe #3 illustrated by way of example, ACK/NACK for both of the frequency bands may be transmitted using a PHICH region; alternatively, only ACK/NACK for the frequency (Carrier 2 in this example) by which DL transmission is enabled may be transmitted using PHICH, and ACK/NACK for the other frequency may be transmitted using a data region.

When ACK/NACK for a plurality of frequency bands is transmitted via UL like the subframe #4 which is also illustrated by way of example, different ACK/NACK may be transmitted for each frequency band; alternatively, single ACK/NACK may be transmitted so that ACK is transmitted when ACK is provided for both of the frequency bands and NACK is transmitted in other cases. Further, only ACK/NACK for the frequency (Carrier 2 in this example) by which UL transmission is enabled may be transmitted using a PUCCH region, and ACK/NACK for the other frequency band may be transmitted using a data region. Furthermore, when UL data transmission is to be performed, a data signal may be punctured to perform transmission using a data region.

Note that the foregoing embodiment has been described on the assumption that an antenna is used, but an antenna port may also be similarly applied. An antenna port means a logical antenna formed by a single or a plurality of physical antennas. In other words, an antenna port does not necessarily mean a single physical antenna, but may mean an array antenna or the like formed by a plurality of antennas. For example, in LTE, the number of physical antennas by which an antenna port is formed is not specified, but an antenna port is specified as a minimum unit that allows a base station to transmit different reference signals. In addition, an antenna port may be specified as a minimum unit by which a precoding vector weight is multiplied.

Further, each functional block used in the description of the foregoing embodiment is typically implemented as an LSI that is an integrated circuit. The functional blocks may be individually implemented on a single chip, or may be partially or entirely implemented on a single chip. In the present invention, each functional block is implemented as an LSI, which may also be referred to as "IC", "system LSI", "super LSI" or "ultra LSI" depending on a difference in packing density.

Furthermore, a method for implementing an integrated circuit is not limited to LSI, but an integrated circuit may be implemented by a dedicated circuit or a general-purpose processor. An FPGA (Field Programmable Gate Array) which is programmable or a reconfigurable processor in which connection and setting of a circuit cell inside an LSI are reconfigurable may be utilized after LSI fabrication.

Moreover, when an integrated circuit implementation technique that replaces LSI makes its appearance due to an advance in semiconductor technology or an alternative technique derived therefrom, functional block integration may naturally be carried out using such a technique. Application of biotechnology or the like may be conceivable.

Although the present invention has been described in detail based on the particular embodiment, it is apparent to those skilled in the art that various changes and modifications may be made without departing from the spirit and scope of the present invention.

The present application is based on Japanese Patent Application No. 2009-147849 filed on Jun. 22, 2009, the contents of which are incorporated herein by reference.

INDUSTRIAL APPLICABILITY

A wireless communication relay station apparatus, a wireless communication apparatus, a wireless communication relay method and a wireless communication method according to the present invention have the effect of enabling effective resource utilization and prevention of loop interference, and thus serve as useful wireless communication relay station apparatus, wireless communication apparatus, wireless communication relay method and wireless communication method.

REFERENCE SIGNS LIST 100 base station
101A, 101B encoder
103A, 103B modulator
105A, 105B subcarrier mapper
107 signal selector
109 IFFT section
111 channel allocator
113 wireless transmitter
115 transmission antenna
117 allocation information generator
119 transmission timing control information generator
121 reception antenna
123 wireless receiver
125 DFT section
127 signal separator
129A, 129B channel estimator/frequency domain equalizer
131A, 131B subcarrier de-mapper
133A, 133B demodulator
135A, 135B IFFT section
137A, 137B decoder
200, 250 mobile station
201 reception antenna
203 wireless receiver
205 DFT section
207 signal separator
209 channel estimator/frequency domain equalizer
211 subcarrier de-mapper
213 demodulator
215 decoder
217 timing information receiver
219 allocation information receiver
221 encoder
223 DFT section
225 modulator
227 subcarrier mapper
229 IFFT section
231 channel allocator
233 wireless transmitter
235 transmission antenna
300 relay station
301 reception antenna
305 DFT section
307 signal separator
309A, 309B channel estimator/frequency domain equalizer
311A, 311B subcarrier de-mapper
313A, 313B demodulator
315 IFFT section
317A, 317B decoder
319A, 319B encoder
321 DFT section
323A, 323B modulator
325A, 325B subcarrier mapper
327 signal selector
329 IFFT section
331 channel allocator
335 wireless transmitter
337 transmission antenna
339 timing controller
341 allocation information receiver
343 transmission/reception timing control information generator

The invention claimed is:

1. A wireless communication relay station apparatus for relaying communication between a first wireless communication apparatus and a second wireless communication apparatus in at least two or more frequency bands, the wireless communication relay station apparatus comprising:

a transmitter which is configured, in a first subframe, to transmit a first uplink signal to the first wireless communication apparatus in a first frequency band, and to transmit a first downlink signal to the second wireless communication apparatus in a second frequency band; and a receiver which is configured, in a second subframe, to receive a second downlink signal from the first wireless communication apparatus in the first frequency band, and to receive a second uplink signal from the second wireless communication apparatus in the second frequency band;

an uplink timing setter which is configured to set a transmission timing for the first uplink signal in the first subframe in accordance with a transmission delay amount between the wireless communication relay station apparatus and the first wireless communication apparatus; and the transmitter is configured, at the set transmission timing, to transmit the first uplink signal to the first wireless communication apparatus in the first frequency band, and to transmit the first downlink signal to the second wireless communication apparatus in the second frequency band;

wherein the uplink timing setter is configured to set the transmission timing so as to increase a symbol number in accordance with an increase in the transmission delay amount between the wireless communication relay station apparatus and the first wireless communication apparatus, the symbol number indicating a position at which the transmission to the first wireless communication apparatus in the first subframe is to be started.

2. The wireless communication relay station apparatus according to claim 1, wherein the first subframe is a subframe configured for an uplink through which a communication between the wireless communication relay station apparatus and the second wireless communication apparatus is performed, and the second subframe is a subframe configured for a downlink through which a communication between the wireless communication relay station apparatus and the second wireless communication apparatus is performed.

3. The wireless communication relay station apparatus according to claim 1, further comprising a control information generator which is configured to generate transmission timing control information indicative of the set transmission timing of the first uplink signal in the first subframe, by the uplink timing setter, wherein the transmitter is configured to transmit the generated transmission timing control information to the second wireless communication apparatus.

4. The wireless communication relay station apparatus according to claim 1, further comprising a downlink timing setter which is configured to set a reception timing for the second downlink signal in the second subframe in accordance with a transmission delay amount between the wireless communication relay station apparatus and the first wireless communication apparatus, wherein the receiver is configured, at the reception timings the downlink timing setter, to start receiving the second downlink signal from the first wireless communication apparatus in the first frequency band, and to start receiving the second uplink signal from the second wireless communication apparatus in the second frequency band.

5. The wireless communication relay station apparatus according to claim 4, further comprising a control information generator which is configured to generate reception timing control information indicative of the set reception timing of the second downlink signal in the second subframe, by the downlink timing setter, wherein the transmitter is configured to transmit the generated reception timing control information to the second wireless communication apparatus.

6. The wireless communication relay station apparatus according to claim 1, wherein the receiver is configured to receive a response signal from the second wireless communication apparatus in the second subframe, the response signal indicating a signal responsive to downlink signals transmitted in the first frequency band and the second frequency band using a third subframe preceding the second subframe by four or more symbols.

7. The wireless communication relay station apparatus according to claim 1, wherein the transmitter is configured to transmit a response signal to the second wireless communication apparatus in the first subframe, the response signal indicating a signal responsive to uplink signals received in the first frequency band and the second frequency band using a fourth subframe preceding the first subframe by four or more symbols.

8. A wireless communication apparatus for communicating with another wireless communication apparatus via a wireless communication relay station apparatus, the wireless communication apparatus comprising:

a receiver which is configured, in a first subframe originally configured for an uplink for communication between the wireless communication relay station apparatus and the wireless communication apparatus, to receive a first downlink signal relayed from the wireless communication relay station apparatus in a predetermined frequency band, and in a second subframe originally configured for a downlink for communication between the wireless communication relay station apparatus and the wireless communication apparatus, to receive an allocation signal that instructs the wireless communication apparatus to transmit a second uplink signal in the second subframe originally configured for a downlink transmission to the wireless communication relay station apparatus; and a transmitter which is configured to transmit the second uplink signal to the wireless communication relay station apparatus in the second subframe in accordance with the allocation signal, wherein:

the transmitter is configured to transmit a response signal to the wireless communication relay station apparatus in the second subframe, the response signal indicating a signal responsive to downlink signals received in the predetermined frequency band and another frequency band different from the predetermined frequency band using a third subframe preceding the second subframe by four or more symbols, and the receiver is configured to receive a response signal from the wireless communication relay station apparatus in the first subframe, the response signal indicating a signal responsive to uplink signals transmitted in the predetermined frequency band and another frequency band different from the predetermined frequency band using a fourth subframe preceding the first subframe by four or more symbols.

9. The wireless communication apparatus according to claim 8, wherein the receiver is configured to receive the first downlink signal from the wireless communication relay station apparatus in the first subframe in accordance with transmission timing control information indicative of a transmission timing of the first downlink signal from the wireless communication relay station apparatus, the transmission timing being set in accordance with a transmission delay amount between the wireless communication relay station apparatus and the another wireless communication apparatus and being coordinated with a transmission timing of a first uplink signal from the wireless communication relay station apparatus to the another wireless communication apparatus in the first subframe.

10. The wireless communication apparatus according to claim 8, wherein the receiver is configured to receive reception timing control information indicative of reception timing of the second uplink signal for the wireless communication relay station apparatus, the reception timing being set in accordance with a transmission delay amount between the wireless communication relay station apparatus and the another wireless communication apparatus and being coordinated with a reception timing of a second downlink signal from the another wireless communication apparatus to the wireless communication relay station apparatus in the second subframe, and the transmitter is configured to transmit the second uplink signal to the wireless communication relay station apparatus in the second subframe in accordance with the reception timing control information.

11. A wireless communication relay method in a wireless communication relay station apparatus for relaying communication between a first wireless communication apparatus and a second wireless communication apparatus in at least two or more frequency bands, the wireless communication relay method comprising:

in a first subframe, transmitting a first uplink signal to the first wireless communication apparatus in a first frequency band, and transmitting a first downlink signal to the second wireless communication apparatus in a second frequency band; and in a second subframe, receiving a second downlink signal from the first wireless communication apparatus in the first frequency band, and receiving a second uplink signal from the second wireless communication apparatus in the second frequency band;

transmitting a signal from an uplink timing setter, the signal setting a transmission timing for the first uplink signal in the first subframe in accordance with a transmission delay amount between the wireless communication relay station apparatus and the first wireless communication apparatus, and transmitting the first uplink signal to the first wireless communication apparatus in the first frequency band and transmitting the first downlink signal to the second wireless communication apparatus in the second frequency band such that the transmission timing is configured to advance a symbol number in accordance with an increase in the transmission delay between the wireless communication relay station apparatus and the first wireless communication apparatus, the symbol number indicating a position at which the transmission to the first wireless communication apparatus in the first subframe is to be started.

12. A wireless communication method in a wireless communication apparatus for communicating with another wireless communication apparatus via a wireless communication relay station apparatus, the wireless communication method comprising:

in a first subframe originally configured for an uplink for communication between the wireless communication relay station apparatus and the wireless communication apparatus, receiving a first downlink signal relayed from the wireless communication relay station apparatus in a predetermined frequency band, and in a second subframe originally configured for a downlink for communication between the wireless communication relay station apparatus and the wireless communication apparatus, receiving an allocation signal that instructs the wireless communication apparatus to transmit its uplink signal in the second subframe originally configured for a downlink transmission to the wireless communication relay station apparatus;

transmitting the uplink signal to the wireless communication relay station apparatus in the second subframe in accordance with the instruction from the allocation signal, transmitting a response signal to the wireless communication relay station apparatus in the second subframe, the response signal indicating a signal responsive to downlink signals received in the predetermined frequency band and another frequency band different from the predetermined frequency band using a third subframe preceding the second subframe by four or more symbols, and receiving a response signal from the wireless communication relay station apparatus in the first subframe, the response signal indicating a signal responsive to uplink signals transmitted in the predetermined frequency band and another frequency band different from the predetermined frequency band using a fourth subframe preceding the first subframe by four or more symbols.

* * * * *